Feb. 11, 1936.   M. S. McKELLAR ET AL   2,030,458
RESILIENT SEAT FOR VALVES
Filed April 6, 1931   2 Sheets-Sheet 1
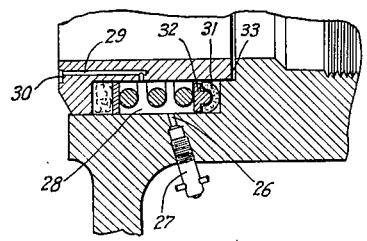
Fig 2
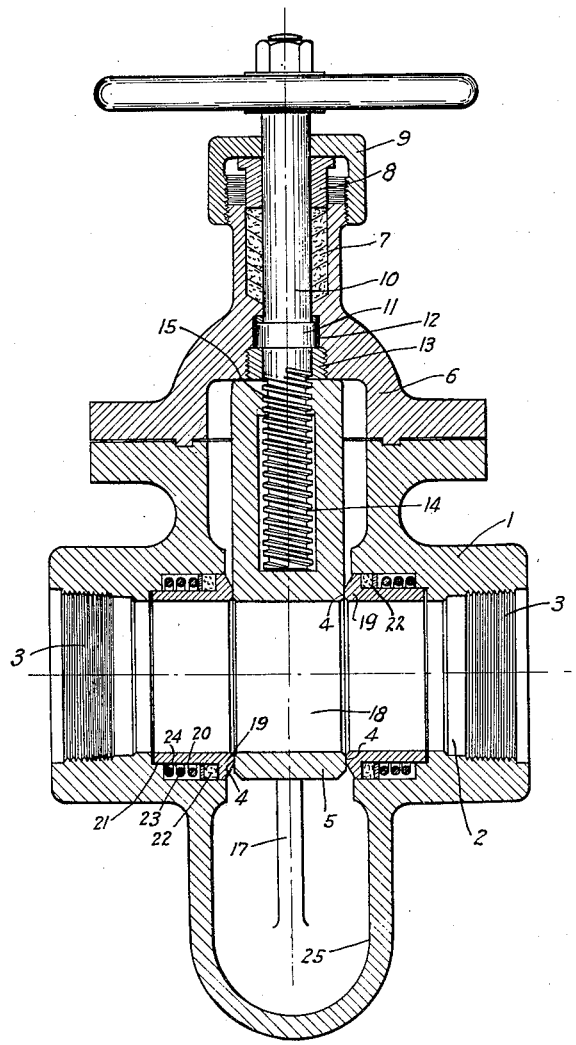
Fig 1
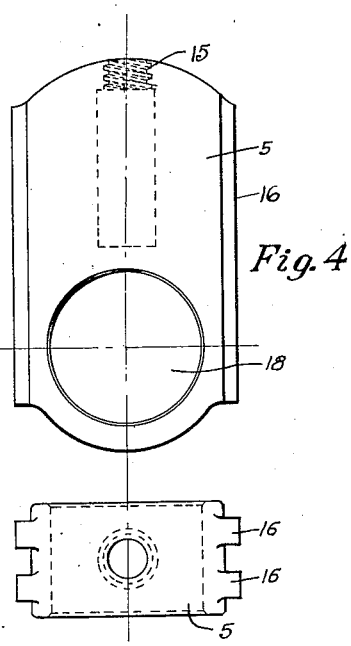
Fig. 4
Fig 3
Marion S. McKellar
Ralph P. Sherman
Harold W. Fletcher
INVENTORS
BY Jesse R. Stone
ATTORNEY Marion S. McKellar
Ralph P. Sherman
Harold W. Fletcher
INVENTORS Patented Feb. 11, 1936

2,030,458

UNITED STATES PATENT OFFICE 2,030,458

RESILIENT SEAT FOR VALVES

Marion S. McKellar, Ralph P. Sherman, and Harold W. Fletcher, Houston, Tex., assignors to Hughes Tool Company, Houston, Tex., a corporation of Texas Application April 6, 1931, Serial No. 528,084

2 Claims. (Cl. 251—167)

Our invention relates to valves, and more particularly to the seat into which the valve member is adapted to fit.

It is a common difficulty in the operation of valves that the valve seat may become worn in use, so that there will not be a close fit maintained between the valve and the seat so as to maintain the seal desired.

It is an object of our invention to provide a valve seat which may be held resiliently against the valve so as to maintain a seal after wear occurs.

We also desire to maintain the valve seat in an automatically adjustable position, so that irregularities in the position or construction of the valve member may be accommodated without leakage about the valve.

We also desire to provide a structure which allows pressure to be exerted upon the valve seat to hold it against the valve if any appearance of leakage occurs.

In the drawings herewith Fig. 1 is a central vertical section through a gate valve embodying our invention.

Fig. 2 is a broken detail of the packing about the valve seat showing means whereby pressure may be exerted on said seat.

Fig. 3 is a top plan view of the gate valve employed.

Fig. 4 is a side elevation of said gate valve.

Figures 5, 6:
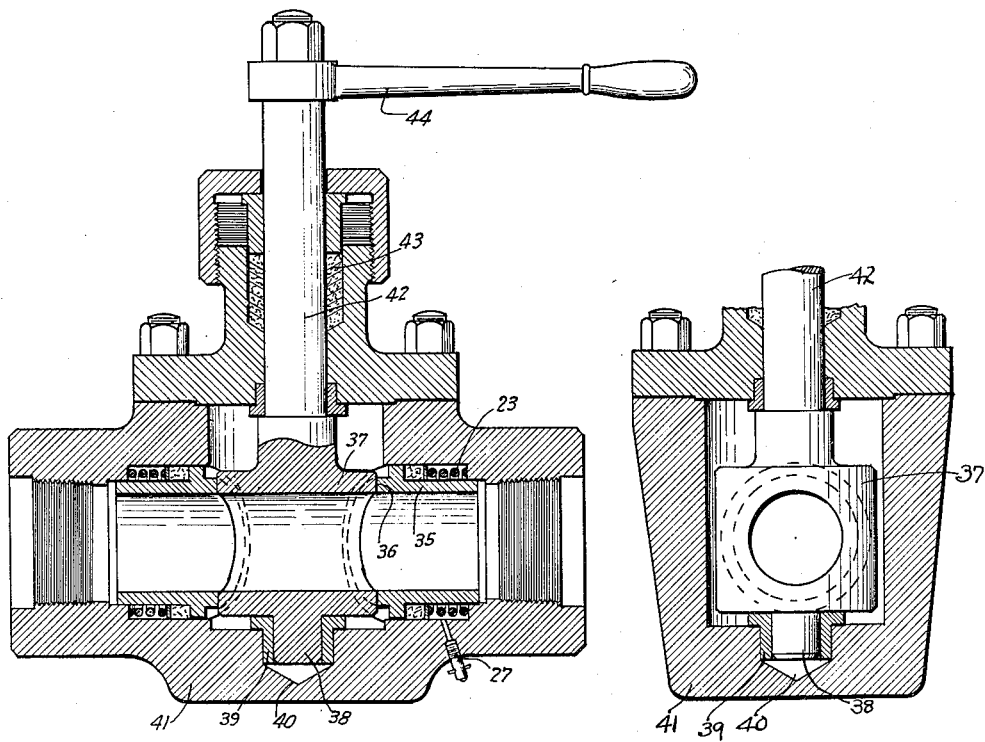
Fig. 5 is a central vertical section through a different type of valve to which our invention may be adapted.
Fig. 6 is a broken vertical section through the valve shown in Fig. 5, said view being at right angles to that shown in Fig. 5.

In Figs. 1 to 4 inclusive, the invention is shown as applied to a gate valve and it may be understood that this invention may be adapted to valves of this general type.

We have shown a valve body 1 having a fluid passage 2 thereto threaded at its ends 3 for connection with a pipe line. Centrally of the ends of the valve body are valve seats 4 into which may fit a valve gate 5.

The valve body has a bonnet 6 of the usual construction having a stuffing box 7 at its outer side, the gland 8 therein being forced against the packing by means of a threaded cap 9.

The valve stem 10 extending through said stuffing box has a radial flange 11 thereon held against longitudinal movement in a recess 12 by means of a nut 13. Below the flange, the valve stem is threaded at 14 to engage within the threaded opening 15 in the outer end of the valve gate 5. This is the usual non-rising stem means for operating a gate valve.

The valve gate 5 is shown as being a flattened plate having its sides formed with a pair of laterally projecting keys or lugs 16 shown in Fig. 3 which fit on opposite sides of a key or flange 17 on the inner wall of the valve body. This holds the gate in aligned position and also prevents any tendency of the gate to rotate when the stem 10 is rotated. At the lower portion of the gate is the fluid opening 18 which when brought into registration through the opening of the body allows free passage of fluid.

The valve seats 4 are ring shaped. They each have a forward head 19 which is flattened to engage with the face of the gate. Said ring has an extension outwardly from said head. The outer diameter of the extension is decreased outwardly from the gate as shown at 20, said extension fitting within a recess 21 within the wall of the body.

A packing 22 is fitted about the extension 20 and is held in compressed position by the spring 23 bearing at its outer end on the shoulder 24.

It will thus be seen that each of the valve seats has a slight sliding movement in the wall of the valve body and is held resiliently against the side of the gate valve by means of the spring 23.

When this valve is to be closed, it is moved downwardly from its position shown in Fig. 1, and the valve body has a lower extension 25 thereon to allow said movement of the valve.

When the valve is moved to its closed position, the valve seats will contact resiliently with the outer face of the gate and maintain a tight seal. When the valve is in open position shown in Fig. 1 there will be a straight passage through the valve with no recesses or lateral openings into which any material may pass.

If it is found that at any time leakage occurs about the valve we may employ fluid pressure within the packing recess as shown in Fig. 2. To accomplish this, a lateral opening 26 is formed leading to the packing recess from the outer side of the valve body. A plug 27 in said opening allows the attachment of a grease gun in a well known manner to force grease through the opening 26 into the packing recess 28. In this manner, a high pressure may be placed against the movable valve seat so as to force it tightly against the gate.

We have also shown a duct 29 formed in the body of the valve seat and leading from the packing chamber 28 to a groove 30 on the forward face of the valve. In this manner, the valve seat may be provided with lubricant so as to assist in forming a fluid seal between the seat and the gate.

We also contemplate the use of a packing ring 31 set in the packing recess at the outer side thereof and formed of semicircular shape in cross-section with the inner opening presented toward a metallic ring 32 adapted to fit within and to expand the packing against the wall of the recess. The said packing will, however, allow a slight opening around the outer side of the seat as shown at 33 for entrance of pressure fluid past the packing and behind the valve seat.

In Figs. 5 and 6 we have shown how the invention may be applied to a plug valve. In this embodiment, the valve seats 35 are similar in construction to those shown in the previous embodiment except that the seating surface 36 is rounded to conform to the cylindrical outer surface of the valve plug 37. The valve plug 37 fits between the opposite valve seats 35 and has a reduced extension 38 engaging within the bushing 39 which is fitted within a recess 40 in the valve body 41. The plug 37 has a stem 42 thereon fitting through a stuffing box 43 and operated by means of a handle 44 on the outer end thereof.

The novelty in this device lies in the arrangement of the valve seat held in position by the springs 23 as in the embodiment previously described.

Lubricant may be employed to increase the pressure of the seat against the valve member through the attachment 27 previously described. We are thus enabled to provide a seal about the valve member for materially longer periods of time than could otherwise be done, due to the capacity of the device to accommodate itself to wear, which is bound to occur in the operation of valves of this character.

What we claim as new is:

1. A valve body having a fluid passage therethrough, a valve in said passage, sleeves slidable in said passage, valve seats on said sleeves, a chamber surrounding each sleeve, and lubricator attachments through which lubricant may be forced against each of said sleeves to move said seats against said valve, there being ducts in said sleeves for lubricant to the faces of said seats, and means to seal about said sleeves in said passage.

2. A valve body having a fluid passage, a valve in said passage, means to open and close said valve, said passage being recessed slightly adjacent said valve, sleeves slidable in said recessed portion, seats formed on the inner ends of said sleeves, springs in said recesses normally urging said seats against said valve, means through which lubricant may be forced into said recesses and lubricant ducts through said sleeves from said recesses to said seats.

MARION S. McKELLAR.
RALPH P. SHERMAN.
HAROLD W. FLETCHER.